Patented Jan. 19, 1926.

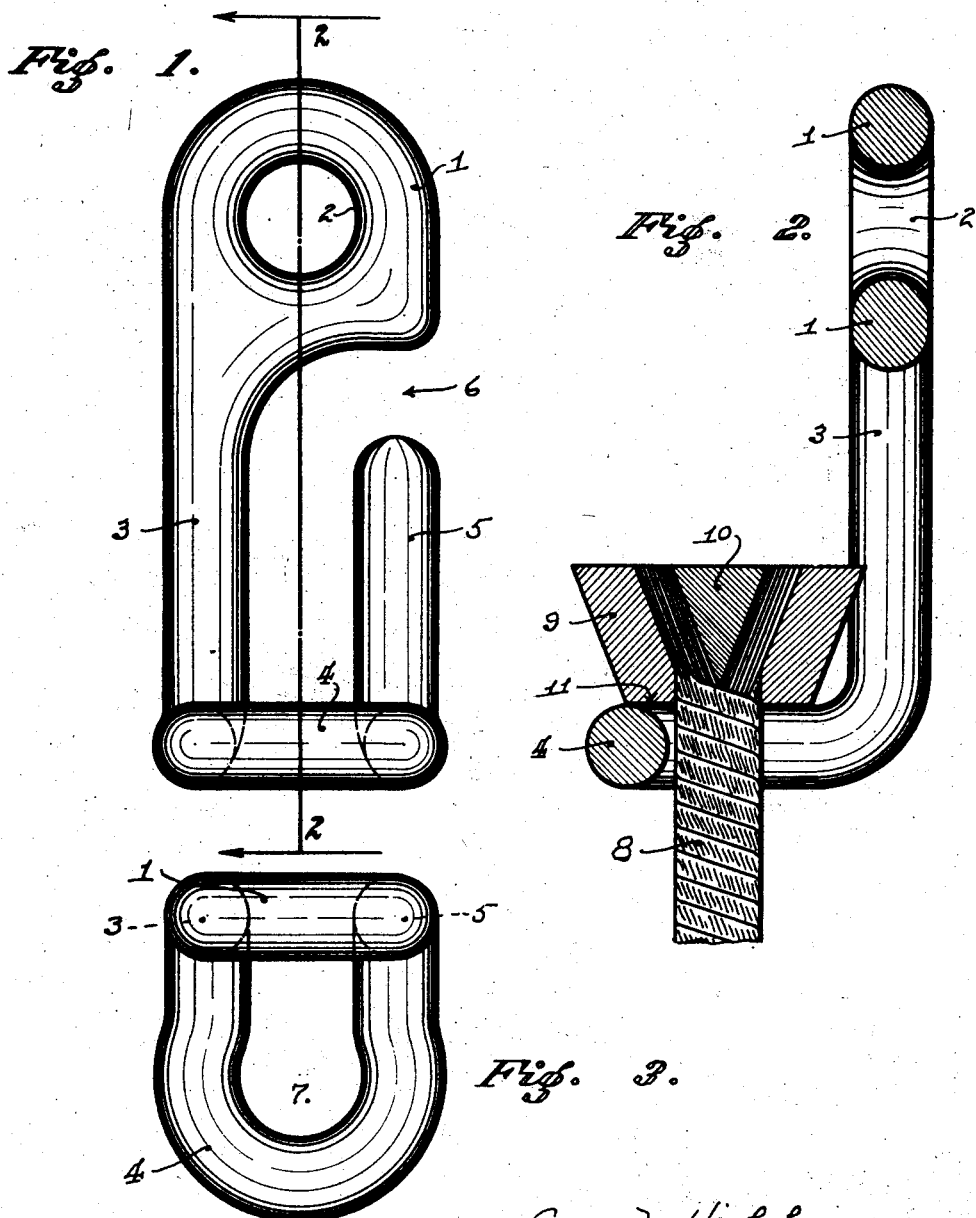

1,570,149

UNITED STATES PATENT OFFICE.

GEORGE F. HICKOK, OF SAN FRANCISCO, CALIFORNIA.

SAFETY HOOK.

Application filed June 27, 1925. Serial No. 39,936.

*To all whom it may concern:*

Be it known that I, GEORGE F. HICKOK, a citizen of the United States, residing at the city and county of San Francisco and State of California, have invented certain new and useful Improvements in Safety Hooks, of which the following is a specification.

My invention relates to the class of safety hooks, and particularly to hooks used for securing and attaching cables in logging, hoisting, or other similar operations.

The object of my invention is to provide a hook of the described type which is simple and inexpensive to manufacture, which can be easily and quickly attached to or detached from a cable, and which possesses a maximum of strength for a given size.

Although my invention is herewith illustrated as embodied in a hook of the butt type, it will be obvious that it may be incorporated in a choker hook or in any other well known form belonging to the same class. It is also to be understood that the form, proportion and arrangement of the device may be varied from that shown and described herein, within the limits of the claims appended hereto, without departing from the spirit of the invention as set forth in said claims.

With this in view a preferred embodiment of my invention will now be fully described with reference to the accompanying drawings, wherein—

Fig. 1 is a front elevation of a safety hook embodying the principles of my invention.

Fig. 2 is a section taken on the line 2—2 of Fig. 1, and showing the end of a cable in engagement with the hook.

Fig. 3 is a top or plan view, the cable being omitted.

My hook is preferably formed by forging a single piece of metal. An offset head 1 is first formed upon one end of a bar or billet, and is subsequently punched to form an eye 2. The remainder of the bar is then bent into the form shown in Figs. 1 and 2, having a straight shank 3, a U-shaped bight or bend 4 disposed at right angles to said shank, and a guard member 5, formed by the terminal portion of the bar, and positioned parallel to and spaced from the shank 3 and the head 1, as shown.

The width of the space or slot 6 between the shank 3 and the guard 5, and also of the eye 7 of the bend 4, is proportioned to receive the cable 8, Fig. 2, the end of said cable being provided with a head or ferrule 9 adapted to bear against the shoulder formed by the bend 4. The ferrule is secured upon the cable end in the usual manner, preferably by having its interior tapered or conical, and by expanding the cable end thereinto and filling the spaces between the separated strands with Babbitt metal, as indicated at 10.

The cable is associated with the hook merely by passing it through the slot 6, and allowing its furrule 9 to seat upon the bend 4, said ferrule having, preferably, a flat bottom 11 to seat firmly upon said bend without causing it to spread. It will be seen that, since there is no portion of the hook through which the ferrule 9 itself must be passed to accomplish the hooking or unhooking operation, said ferrule can be made of ample size to prevent it from pulling off the end of the cable under strain, without necessitating that the hook itself be made unduly large and unwieldy. It is also to be observed that, on account of its shape, my hook can be successfully forged from a single billet or bar, thereby making a hook of maximum strength.

I claim:—

1. A safety hook formed from a single bar of metal, said bar having an attaching head formed at and offset from one end, and the remainder of said bar being bent to a U-shape, the bight of said U-shape being bent at right angles to its legs, and the free leg thereof terminating at a distance from said head equal to the space between said legs.

2. A safety hook comprising a shank; an attaching head at one end of the shank; a U-shaped bend at the other end of the shank, lying in a plane perpendicular to the plane of said shank, one extremity of said bend being associated with the shank end and the other extremity free thereof, and a guard member extending from said free extremity of the bend parallel with and spaced from the shank to form a slot leading into said bend, the entrance to said slot, lying between the head and the end of said guard member, being at right angles to its length.

In testimony whereof I have signed my name to this specification.

GEORGE F. HICKOK.